3,592,792
AGRICULTURAL PLASTIC FILM
Gordon C. Newland, Roger M. Schulken, Jr., and Raymond C. Harris, Kingsport, Tenn., assignors to Eastman Kodak Company, Rochester, N.Y.
No Drawing. Filed July 24, 1968, Ser. No. 747,076
Int. Cl. A01g 7/00; C08f 45/66
U.S. Cl. 260—41
9 Claims

ABSTRACT OF THE DISCLOSURE

Poly-α-olefin films for use as agricultural ground cover can be made heat absorbent to assist in plant development while preventing weed growth, and thereafter heat reflective to give increased crop production, and thereafter friable, by the incorporating into the film composition certain fugitive heat absorptive colorants, light reflective opaquing pigments, and pro-oxidants.

This invention relates to agricultural films which have controlled heat absorption, reflectivity and deterioration lives and further concerns the preparation of these films.

The desire to improve horticultural techniques has in recent times fostered the use of opaque plastic film such as black polyethylene for covering the soil between plants, thereby preventing photosynthesis and the growth of weeds, and conserving soil moisture. Films heretofore employed, however, have not provided the answer to the weed problem in large scale farming since they must eventually be removed from the fields. This, of course, involves considerable non-profitable labor. Moreover, the reflectivity characteristics of black polyethylene is poor and does not allow for the full development of the plants and maximum crop production.

Objects, therefore, of the invention are: to advance the state of the horticultural art by providing plastic film which, when laid on soil surrounding planting sites, will absorb heat to assist in the development of the young plant or germination of the seed while suppressing weed growth through film opacity, will, after a controlled period of time, continue to suppress weed growth while reflecting heat and light to the growing plant, and after a controlled period of time become sufficiently friable to be plowed into the ground.

These and other objects which will become apparent through the following disclosure have been attained through the discovery that plastic films, particularly of polyolefins including copolymers and block polymers, and especially polyethylene and blends thereof with other polyolefins can be so chemically consituted that the original heat absorbing characteristic is fugitive and changes to one of reflectivity, and at the end of a required period they are sufficiently friable to be easily and effectively plowed into the ground. Moreover, an innumerable variety of additional materials such as plant foods, fertilizers, insect repellents, insecticides, fungicides, animal repellents, bactericides, soil conditioners and the like in a wide range of concentrations may be incorporated into these plastic films to perform desired functions. Particularly important and useful herein are the nitrogen releasing fertilizers such as ammonium and potassium nitrates which may be used in amounts giving up to about 20% by weight of available nitrogen. In general, the amount of such materials which may be employed will be limited by decrease in tensile properties of the initial films. A total concentration of up to about 35% by weight is useful herein.

More specifically, it has been discovered that plastic film may be made suitable for the aforesaid agricultural purposes by incorporating therein one or more dark fugitive colorants, light reflective pigment, and one or more oxidation catalysts (pro-oxidants) in amounts especially prescribed for the growing period of a particular crop. Any of a large variety of colorants, pigments and pro-oxidants may be employed within the scope of the present invention, the major requirement thereof being that they carry out their functions at predeterminable and controllable rates.

Useful pro-oxidants include: manganous stearate, manganous oleate, manganous acetate, manganous dodecyl acetoacetate, cobalt acetyl acetonate, cobaltous oleate, cobaltous stearate, cobaltous dodecyl acetoacetate, cupric stearate, cupric oleate, and ferric acetate. Although the above are preferred, in general, a large variety of known pro-oxidants which substantially increase the rate of photo-oxidation may be employed in accordance with the present invention. The representative illustrations given herein show that useful pro-oxidants include the acetylacetonates of manganese, cobalt, chromium, copper and vanadium, the alkyl acetoacetates (8 to 18 carbons in the alkyl group) and alkyl (8 to 18 carbons) benzoylacetates of manganese, cobalt, iron, nickel and zinc. It is noted that the rates of degradation, of course, will vary and the proper concentration of these various pro-oxidants may be adjusted by one skilled in the art to give the proper deterioration rate.

As aforesaid, the amount of pro-oxidant employed will depend on its activity; however, total amounts of one, or mixtures of two or more of the pro-oxidants equalling from about 0.001 to about 10.0% by weight based on the polyolefin weight find utility in the present invention. Where the most preferred manganous and cobaltous stearates and oleates are employed either alone or admixed, the total concentration is preferably in the range of from about 0.01 to about 0.5%, and most desirably from about 0.01 to about 0.2% by weight based on the polyolefin weight. When used in admixture, each pro-oxidant concentration may range from approximately 0 to about 100% of the pro-oxidant mixture and may be blended either separately or as a mixture into the polyolefin. These pro-oxidants in powdered form blend very readily by, for example, rolling or milling into the polyolefin and are seen to become essentially completely and homogeneously dispersed therein.

In order to render the film heat absorbent for controlled periods of time, the following representative, fadable colorants may be employed:

| | |
|---|---|
| Logwood | Naphthal Black B |
| Chromogene Black | Coomassie Wool Black R |
| Celliton Fast Black BTWA | Naphthylamine Black D |
| Aniline Black | Chlorozal Black LF |
| Caledon Black | Clayton Black |
| Chloramine Black N | Sulfur Black T |
| Alizarine Black R | Immedial Black FF |
| Eriochrome Black T | Columbia Black EAW |
| Anthracene Chrome Black | Diamond Black F |
| Palatine Chrome Black 6B | Diamine Black BH |

These dyes are identified and the method of synthesis described in "The Synthetic Dyestuffs and Intermediates from Which They are Derived," by J. E. Thorpe and R. P. Linstead, Charles Griffin and Company, Ltd., London, England.

Other dyes than those specifically mentioned above are of course, useful in the present invention. The principal requisites of the useful dyes, regardless of their colors, are that they render the film heat absorptive, and fade out at a controlled and predeterminable rate. The dye and its concentration are selected according to the requirements of the particular plants and the particular weather conditions of the area. These adjustments are readily made by the compounder in a routine manner. The terms "heat absorptive" as used herein define those dyes which have coefficients of absorption of solid radiation of at least about 0.5 and preferably above about 0.7. These coefficients are equal to $$\frac{I_o - (I_r + I_t)}{I_o}$$

wherein $I_o$ is the impinging solar radiation intensity, $I_r$ is the intensity of reflected radiation, and $I_t$ is the intensity of transmitted radiation.

The amount of colorant or dye employed can range quite widely depending on conditions of use, but is usually present in an amount of from about 0.1 to about 10% and preferably from 0.1 to 5% by weight based on the weight of the polyolefin.

The film opacity is obtained by blending into the composition an amount of white pigment such as $TiO_2$ or ZnO such that preferably less than about three percent of ordinary sunlight is transmitted through the polyolefin film; more specifically, the film in the preferred embodiment has an optical density greater than 1.5 to visible light and to ultraviolet down to 300 m$\mu$ wave-length. For certain applications less complete opacities are useful, for example, transmissions of 10% or less. For many applications, a transmittance of less than 1% is required. Usually, from about 1 to about 10% and preferably from about 3 to 7% by weight of the pigment is employed.

The thickness of any particular film will, of course, be a factor regulating its rate of deterioration. For most agricultural purposes a film of about 3 mils thickness is satisfactory from the standpoints of initial strength and adjustability of deterioration rate.

The following examples will further illustrate the invention. The compositions were formulated by standard plastic blending techniques and evaluated in an Atlas Weather-Ometer. The compositions consist of a polymeric film forming material containing an opacifying pigment, a fugitive black dye and an accelerator of photodegradation. Test results show that the black color faded in the early exposures to leave a white film which became friable on further exposure. The polyethylene employed in the examples was low density, however, medium and high density polyethylenes as well as other poly-α-olefins may be employed in practicing the present invention.

EXAMPLE 1

Polyethylene having a density of 0.918 and a melt index of 1.7 was hot-roll-compounded with the ingredients as shown in Table 1 for 4 minutes. The front roll and rear roll of the rolling mill were maintained at 270 and 220° F., respectively. Films 8 mils thick were compression molded from each composition and evaluated in an Atlas Sunshine Arc Weather-Ometer, Type XWR, for dye fading and embrittlement. The compositions and the test results are summarized in Table 1. As shown in Table 1 the compositions containing the black dye faded in ⅛ of exposure necessary to degrade the composition containing the accelerator, cobalt acetylacetonate.

EXAMPLE 2

The film compositions of Example 1 were exposed for 24 hours at a distance of 4 inches from a 275 w. RS-sunlamp. Examination of the exposed films in relation to unexposed sections revealed that the dye was partially faded and that the films were not embrittled.

TABLE 1

| No. | Polyethylene containing— | | | Test results, XWR Weather-Ometer exposure |
|---|---|---|---|---|
| | Pigment | Colorant | Accelerator | |
| 1 | 5% $TiO_2$ | None | None | No change in 800 hr. |
| 2 | 5% $TiO_2$ | .5% Nigrocene [1] | do | Faded to white in 100 hr. |
| 3 | 5% ZnO | None | do | No change in 800 hr. |
| 4 | 5% ZnO | .5% Nigrocene | do | Faded to white in 100 hr. |
| 5 | 5% $TiO_2$ | do | .01% cobalt acetylacetonate. | Faded to white in 100 hr.; was friable in 800 hr. |

[1] Nigrocene is the product of the oxidation of aniline and aniline hydrochloride as defined in "Chemistry of Synthetic Dyes and Pigments," H. A. Lubs, Rheinhold Pub. Corp., New York, 1955, pp. 242-3. It comprises dyes of color indices 5045-50440 and 864-865.

It is thus seen that the films of the present invention exhibit a combination of properties not heretofore envisaged, and perform the several functions of assisting in the germination or infant growth process, suppressing weed growth, assisting in the full maturation of the plant, increasing plant production, and becoming itself friable at the end of the growing season.

The invention has been described in detail with particular reference to preferred embodiments thereof, but it will be understood that variations and modifications can be effected within the spirit and scope of the invention as described hereinabove and as defined in the appended claims.

We claim:

1. A poly-α-olefin composition containing an opaquing amount of from about 0.1 to about 10% by weight of a white pigment;
    a dark, fugitive, heat absorbing colorant having a coefficient of absorption of solar radiation of at least about 0.5; and
    from about 0.001 to about 10% by weight of a pro-oxidant selected from manganous stearate, manganous oleate, manganous acetate, manganous dodecyl acetoacetate, cobalt acetyl acetonate, cobaltous oleate, cobaltous stearate, cobaltous dodecyl acetoacetate, stearate, cupric oleate, ferric acetate; the acetylacetonates of managnese, cobalt, chromium, copper or vanadium; the alkyl acetoacetates (8 to 18 carbons in the alkyl group); or alkyl (8 to 18 carbons) benzoylacetates of manganese, cobalt, iron, nickel or zinc, said pro-oxidant rendering the composition friable after a predetermined period of time.

2. The composition of claim 1 wherein the poly-α-olefin is a polyethylene.

3. The composition of claim 2 wherein the white pigment is $TiO_2$ or ZnO.

4. The composition of claim 2 wherein the colorant is Nigrocene.

5. The composition of claim 2 wherein the pro-oxidant is cobalt acetylacetonate.

6. The composition of claim 2 wherein the colorant is Nigrocene and the white pigment is $TiO_2$ or ZnO.

7. A film of the composition of claim 1.

8. A film of the composition of claim 2.
9. A film of the composition of claim 6.

References Cited

UNITED STATES PATENTS

| | | | |
|---|---|---|---|
| 3,274,731 | 9/1966 | Vigneault | 47—9 |
| 3,308,578 | 3/1967 | Karcher et al. | 47—9 |
| 3,320,695 | 5/1967 | Moore, Jr. | 47—9 |
| 3,454,510 | 7/1969 | Newland et al. | 47—9 |

FOREIGN PATENTS 1,052,998  12/1966  Great Britain _____ 47—9

MORRIS LIEBMAN, Primary Examiner
S. L. FOX, Assistant Examiner

U.S. Cl. X.R.

47—9